INVENTORS
Eugene W. Scott &
Charles F. TerBush
BY
*Edward C. Greeny*
ATTORNEY

United States Patent Office 3,475,922
Patented Nov. 4, 1969

3,475,922
LIQUID COOLING CHAMBER
Eugene W. Scott, Columbus, and Charles F. Ter Bush, Grove City, Ohio, assignors to Westinghouse Electric Corporation, Pittsburgh, Pa., a corporation of Pennsylvania
Filed July 31, 1967, Ser. No. 657,126
Int. Cl. B67d 5/62; F28f 1/36, 3/12
U.S. Cl. 62—394                              4 Claims

ABSTRACT OF THE DISCLOSURE

Drinking water refrigerated cooling chamber having an annular space formed between an outer cylindrical casing and a coaxial inner cylinder to receive corrugated heat exchange fins forming a plurality of parallel flow paths through which substantially all of the incoming water is constrained to pass to avoid mixing incoming water with previously cooled water in the chamber. The individual corrugations are formed with slightly bulbous crests to close the adjacent corrugations at the inner periphery while leaving them open at the outer periphery.

CROSS REFERENCE TO RELATED APPLICATION

This application is related to Scott U.S. patent application Ser. No. 657,127 entitled "Freezable Water Cooling Chamber," and filled simultaneously herewith.

BACKGROUND OF THE INVENTION

Field of the invention

The invention relates generally to the art of fluid cooling and relates particularly to liquid cooling chamber structures.

Description of the prior art

Water cooling chambers for electric water coolers serve to cool quickly the incoming water, and also to provide a reservoir of cool water to maintain adequate service during high withdrawal rates. Trade association standards are provided for rating the water coolers in accordance with their capacity to effect a given reduction in temperature of a given amount of incoming water in a given period. For example, a cooler may be required to cool a given quantity of 80° F. incoming water to 50° F. in a given time. Additionally, the cooler must typically meet a peak-draw requirement, such as drawing off ⅜ of the capacity of the water cooler in a 15 minute period, without the water being drawn off exceeding 60° F.

One typical construction of a cooling chamber of the prior art type which has satisfactorily met the standards noted is shown in FIG. 1 of the drawing. That structure generally includes a single outer cvylindrical shell exteriorly wrapped with refrigerant tubes and with a pleated and circularly formed sleeve disposed against the inner face of the cylindrical side wall. A square baffle adjacent the top inlet end of the shell with corners resting on the pleat top ends deflects most of the incoming water out toward the side walls. Another prior art version has a circular baffle with a circumference coincident with the inner periphery of the pleats. A part of the deflected water flows down within the cross-sectionally triangular channels formed between the pleats and the shell side wall and is subject to a greater cooling effect than the remainder of the water which is able to mix with previously cooled water in the central part of the chamber.

The prior art arrangements do not take advantage of the heat exchange efficiency attainable by maintaining a substantial temperature gradient between all of the incoming water and the refrigerated surfaces. An object of this invention is to provide a more efficient cooling chamber structure which thus permits a substantial reduction in size. The size reduction extends to other parts of the water cooler as well. An example of the reduction afforded by the new construction, for a given capacity water cooler, is about 1 to 3 in chamber diameter, and about 1 to 5 in volumetric capacity.

SUMMARY OF THE INVENTION

The structure according to the invention is the result of an effort to apply basic heat transfer principles in a manner yielding maximum heat transfer under the operating conditions encountered in a pressure water cooler. In essence the cooling chamber is arranged both to prevent mixing of previously cooled water with the incoming water, and to increase the relative velocity between incoming water and the cooling surfaces, and thus yield more efficient heat transfer through maintaining a greater temperature gradient between the water to be cooled and the refrigerating means.

This is attained by dividing the chamber into an inner space, and a radially outer annular space through which all of the incoming water must pass. Fin means in the annular space divide it into a plurality of parallel paths providing extended surface heat transfer.

DRAWING DESCRIPTION

DESCRIPTION OF THE PREFERRED EMBODIMENT

Figure 2:
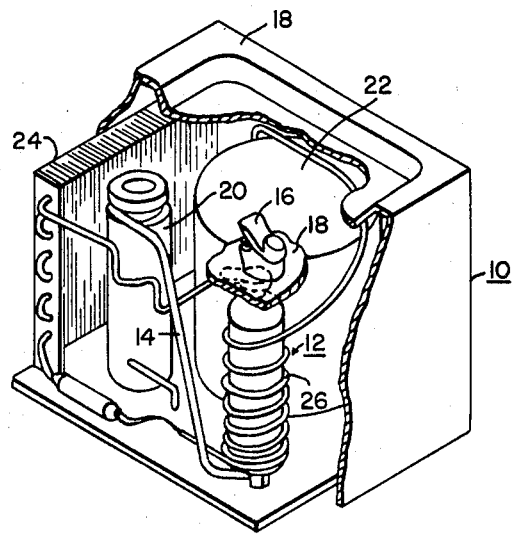
FIG. 2 is an isometric view of a drinking water cooler, with a portion of the cabinet broken away to expose some of the main interior parts.

The drinking water cooler illustrated in FIG. 2 generally includes: a cabinet 10; a cooling chamber 12 supplied with water at the bottom through tube 14 and having a top-connected bubbler valve 16; a basin top 18 having a drain outlet (not shown) connected to the precooling and insulated drain pipe 20; and a refrigeration system including a compressor 22, condenser 24, and evaporator coils 26 wrapped about the exterior of the cooling chamber 12. The chamber and coils are covered with thermal insulation (not shown) for cold retention.

Figure 3:
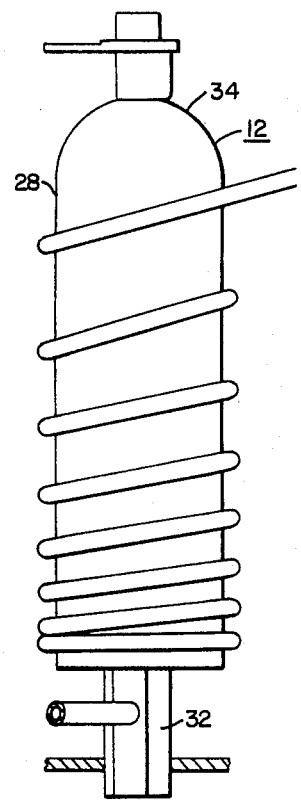
FIG. 3 is an elevational view of a cooling chamber according to the invention.
Figure 4:
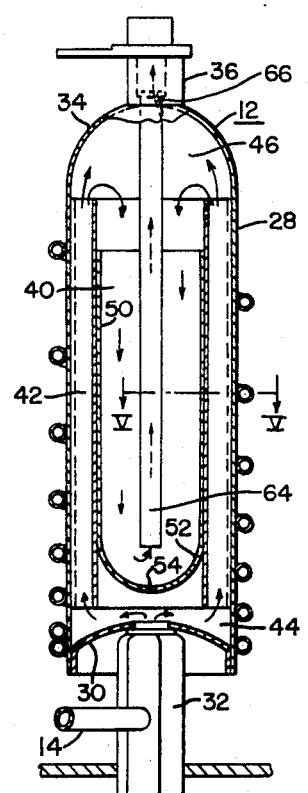
FIG. 4 is a vertical sectional view of the cooling chamber of FIG. 3.
Figure 5:
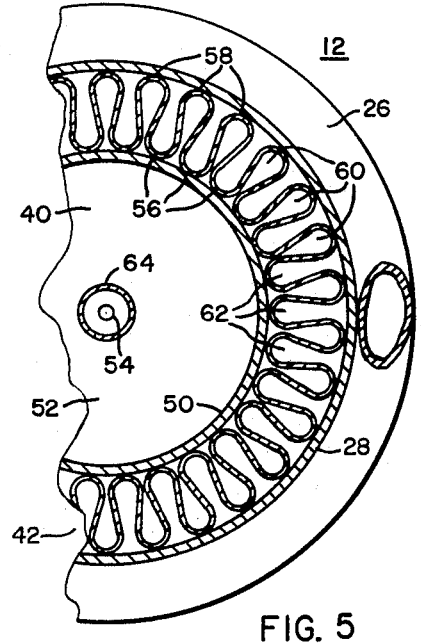
FIG. 5 is a horizontal sectional view corresponding to one taken along the line V—V of FIG. 4.

The cooling chamber 12, as shown in considerable detail in FIGS. 3-5, includes an outer casing having a right cylindrical side wall 28, and a concave bottom end closure 30 with a central water inlet fitting 32 to which supply pipe 14 is connected, and a convex top end closure 34 with a central water outlet 36. The bubbler 16 may be attached directly to the outlet fitting 36 after the top basin 18 is installed.

An inner barrier is coaxially arranged within the outer casing (FIG. 4) to divide the interior generally into a central space 40 and a radially outer annular space 42. The bottom space 44 adjacent the water inlet 32 and below the central space is open to the annular space only (save for a small drain port) while the top space 46 adjacent the water outlet 36 is open to both the central space and the annular space.

The coaxially arranged barrier within the cooling chamber in its currently preferred form of manufacture comprises a deep, upwardly open cup having a right cylindrical side wall 50 and a convex bottom wall 52.

The bottom wall has the small drain port 54 in its center.

The heat exchange means for the annular space 42 may be fabricated, for example, from thin (e.g. 0.005 inch thick) sheet stock which is first corrugated and then formed into a circular sleeve dimensioned to be accommodated in the annular space 42, with the corrugations being vertically disposed to provide a plurality of separate, upright passages in the annular space. The alternating, oppositely directed corrugations may be of identical cross-section while the sheet is in planar form, and include crest portions which are generally bulbous-shaped to a degree that when the sheet is manipulated into its circular sleeve shape and installed in the annular space, the facing sides of adjacent inner periphery crests 56 (FIG. 5) abut each other, or are only slightly apart from each other, while the facing sides of the outer periphery crests 58 are open. Accordingly, two distinct and alternating types of vertical passages are formed in the annular space 42. The one set of passages designated 60 are bounded at their radially outer sides by the outer periphery crests 58, and at their inner radial sides by the contacting sides of the inner periphery crests 56. The other set of passages 62 are bounded at their radially inner sides by the inner periphery crests 56 and at their outer sides by the outer casing wall 28.

In the exemplary construction illustrated, the inner, deep cup 50 in the cooling chamber serves a dual function. First, with the corrugated fins in place in the outer casing, the insertion of the cup forces the corrugations radially outwardly so that the outer periphery crests 58 tightly engage the wall 28 for good heat transfer. Second, the deep cup 50 backs up the coaxial barrier formed by the contacting inner periphery crests 56, and the closed bottom end 52 of the cup serves as the means for directing substantially all of the inlet flow out into the annular space. It will be appreciated however, that the deep cup 50 may be omitted as such so long as its functions are performed by other means. Such other means may, for example, take the form of a shallow cup at the bottom forming the flow directing wall 52, and then several vertically spaced expander rings which insure that the corrugated fins are pushed out firmly against the outer casing wall 28. In this case, of course, the coaxial barrier is formed by the closure of the upright passages 60 at their radially inner sides by the facing contacts of the inner periphery crests 56.

In the preferred form, for commercial purposes, the chamber outlet is connected to a central draw tube 64 (FIG. 4) which extends down to near the bottom of the deep cup. The draw tube insures that with water withdrawal from the cooler at infrequent intervals, the water will be withdrawn from adjacent the lower part of the chamber and hence be the cooler water. The upper end of the tube has a crease 66 forming a bypass for air elimination or, alternatively, a hole therein at the upper extremity of the chamber may serve for air elimination. It is noted that the provision of a draw tube has no apparent relation to the efficiency of the chamber for capacity rating purposes.

The direction of flow of water through the cooling chamber is as indicated by the directional arrows of FIG. 4. Water supplied under pressure through the supply line 14 enters the lower portion 44 of the cooling chamber and is constrained by the bottom wall 52 of the cup 50 to flow out into the annular space 42 and upwardly through the heat exchange passages 60 and 62 for cooling. The cooled water exiting from the top of the passages flows down into the cup and then out through the bubbler along with some of the previously cooled water drawn from the central space 40. Thus, for practical purposes, all of the water reaching the bubbler first passes up through the annular space 42 since the quantity passing through the drain hole 54 is negligible.

Figure 1:
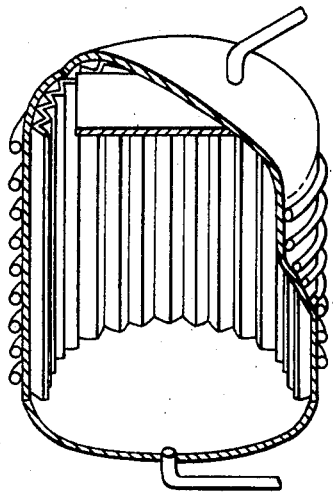
FIGURE 1 is a broken isometric view of a typical prior art cooling chamber which the cooling chamber of the invention is intended to replace.

The manner in which incoming water is cooled as it passes up through the two distinct types of upright heat exchange passages 60 and 62 formed by the corrugated heat exchange means in the annular space will now be considered. The cup bottom 52 and coaxially arranged barrier means prevent the warm incoming supply water from mixing with the cool water in the central part of the cooling chamber. The water passing up through the passages 62, which are open on their radially outer sides to the outer casing side wall 28, is chilled both through contact directly with the side wall, and with the corrugation surfaces bounding the remainder of the passage. The water passing up through each alternate passage 60 is cooled solely through contact with the corrugation surfaces bounding the passage. The corrugations of course exchange heat with the casing wall 28 and hence the refrigerant coils 26, as well as to a lesser degree with the inner cup wall 50. With the described arrangement, wherein all of the incoming water is directed up through the annular space and is prevented from mixing with the cool water inside the barrier, a higher temperature gradient is maintained between the cooling surfaces and the incoming water than in a cooling chamber of the prior art type shown in FIG. 1. In that type, since the baffling of the incoming water in incomplete, only that part of the incoming water which is trapped in the generally triangular shaped space between the pleats and the outer cylinder wall is prevented from mixing with the interiorly cooled water. The incoming water in the prior art structure which mixes with the interior water has its temperature accordingly reduced so that the heat transfer between it and the pleated heat exchange means is substantially reduced, as compared to a construction according to this invention.

The benefits directly attributable to the structure include the capability of a relatively small chamber (e.g., about ⅓ the diameter and about ⅕ the volumetric capacity of the prior art type of cooling chamber) to satisfy the same chilling capacity standards. Obviously, the quantity of material required for the structure according to this invention is substantially less in many respects than that required for the prior art structure, and permits a reduction in overall size of the entire water cooler. Also, the small size chamber (e.g., 2½" dia.) permits the deep cup 50 to be made from standard stock copper pipe by simply spinning the end shut.

As noted before, while the preferred construction at present includes the deep cup 50, the bulbous crested corrugations of the heat exchange means may permit the cup to be omitted as such by utilizing the contact between adjacent inner periphery corrugations to form an adequate coaxial barrier. However, in all cases it is desirable that the corrugations be held tightly out against the outer casing wall, and it is necessary that the bottom end of the central space be almost completely blocked to insure that substantially all the incoming water will be directed up through the annular space. The specially shaped heat exchanger corrugations of course also yield a greater surface area of heat exchange means than would simple pleats, or sine wave shaped corrugations.

We claim as our invention:

1. A drinking water cooler including a cooling chamber comprising:
   an outer casing having an inlet for liquid at one end and an outlet for liquid at the other end;
   refrigerating means in the form of spaced apart refrigerant coils wrapped in heat exchange relation about the exterior of said outer casing;
   means defining a liquid barrier disposed coaxially within said outer casing to form therewith an annular space extending for the major portion of the length of said outer casing, and an interior chilled water storage space open at the outlet end of said chamber;
   means adjacent the inlet end of said outer casing for constraining substantially all of the inlet liquid to flow through said annular space to reach said outlet end and the opening to said storage space;

fin means separating said annular space into a plurality of paths between the inlet and outlet ends of said outer casing, said fin means including outer portions thereof firmly contacting said outer casing to promote heat exchange between said outer casing and said fin means; and said fin means comprise corrugated sheet means formed into a circular sleeve occupying said annular space and in which the inner periphery crests and outer periphery crests are both circularly bulbous shaped, with the facing sides of adjacent inner periphery crests contacting each other to substantially close off the radially inner side of each space having an outer periphery crest.

2. A cooler according to claim 1 wherein:

adjacent ones of said corrugations are of substantially uniform cross section as formed from said sheet means, and said sleeve occupies said annular space with the facing sides of adjacent outer periphery crests out of contact with each other so that the outer side of each space having an inner periphery crest is in open communication with said outer casing.

3. A drinking water cooler including a cooling chamber comprising:

a right-cylinder-shaped outer casing having a bottom inlet end and a top outlet end;

refrigerating means in the form of spaced apart refrigerant coils wrapped about said outer casing for extracting heat;

a right-cylinder-shaped, upwardly open, inner cup coaxially disposed within said outer casing to provide a central storage space, and to define an outer annular space between the side walls of said inner cup and said outer casing, said inner cup having a substantially closed bottom wall for constraining substantially all of the incoming liquid to flow out into said annular space;

extended surface heat exchange means in the form of corrugated fin means disposed in said annular space to provide a plurality of vertically extending, parallel paths in said annular space, said parallel paths comprising one series of alternate paths having outer sides open to said outer casing side wall, and another series of alternate paths separated from said outer casing side wall by crests of corrugations;

said corrugations have circularly bulbous crests along both the inner and outer peripheries in said annular space, with the facing sides of adjacent inner periphery crests being in contact with each other and the facing sides adjacent outer periphery crests being spaced from each other;

said contacting facing sides of said inner periphery crests providing sealing between said outer annular space and said central space for the length of said fin means and independent of the length of said inner cup.

4. A cooler according to claim 3 including:

a draw tube extending downwardly from said outlet and having a bottom open end adjacent said cup bottom wall.

References Cited

UNITED STATES PATENTS

| | | | |
|---|---|---|---|
| 2,186,900 | 1/1940 | Dick et al. | 62—395 |
| 3,200,848 | 8/1965 | Takagi | 138—38 |

FOREIGN PATENTS

| | | |
|---|---|---|
| 522,305 | 6/1940 | Great Britain. |
| 977,455 | 12/1964 | Great Britain. |

ROBERT A. O'LEARY, Primary Examiner

ALBERT W. DAVIS, Assistant Examiner

U.S. Cl. X.R.

62—399, 516; 165—155, 179, 183, 169